US 10,159,173 B2

(12) United States Patent
Sudbrink et al.

(10) Patent No.: US 10,159,173 B2
(45) Date of Patent: Dec. 25, 2018

(54) ANTI WOBBLING CASTOR WHEEL CONFIGURATION

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 92 days.

(21) Appl. No.: 15/148,447

(22) Filed: May 6, 2016

(65) Prior Publication Data
US 2017/0318733 A1 Nov. 9, 2017

(51) Int. Cl.
*A01B 76/00* (2006.01)
*A01B 63/00* (2006.01)
*A01B 59/042* (2006.01)
*B60B 33/00* (2006.01)
*B60B 33/06* (2006.01)

(52) U.S. Cl.
CPC ............ *A01B 76/00* (2013.01); *A01B 59/042* (2013.01); *A01B 63/002* (2013.01); *B60B 33/0002* (2013.01); *B60B 33/066* (2013.01)

(58) Field of Classification Search
CPC .............................. A01B 76/00; B60B 33/006
USPC ........................................................ 172/669
See application file for complete search history.

(56) References Cited

U.S. PATENT DOCUMENTS

| 1,288,773 | A | * | 12/1918 | Waterman | A01B 63/18 |
| | | | | | 172/386 |
| 1,409,219 | A | * | 3/1922 | Krotz | A01B 63/163 |
| | | | | | 172/386 |
| 1,489,467 | A | * | 4/1924 | Strandlund | A01B 63/166 |
| | | | | | 172/386 |
| 1,598,803 | A | * | 9/1926 | Brown et al. | A01B 63/166 |
| | | | | | 172/386 |
| 2,221,099 | A | | 11/1940 | Large | |
| 2,239,961 | A | | 4/1941 | Hipple | |
| 2,353,659 | A | * | 7/1944 | Frank | A01B 63/163 |
| | | | | | 172/386 |
| 2,490,656 | A | * | 12/1949 | Seaholm et al. | A01B 3/46 |
| | | | | | 172/386 |
| 2,660,940 | A | * | 12/1953 | Baughman | A01B 69/004 |
| | | | | | 172/386 |
| 2,682,822 | A | * | 7/1954 | Toland et al. | A01B 63/16 |
| | | | | | 172/386 |
| 2,812,630 | A | | 11/1957 | Elfes | |

(Continued)

FOREIGN PATENT DOCUMENTS

GB    1 126 769    9/1968

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A castor wheel support for a towed agricultural implement having a frame positioned parallel to the soil over which the implement is towed. Parallel links interconnect the castor support with the frame. The castor support has a spindle with a longitudinal axis A for supporting a castor mounting structure for pivoting movement. The castor mounting structure supports an axle hub assembly and a wheel. The axis A of the spindle is angled forward 3 degrees to minimize wobbling.

8 Claims, 3 Drawing Sheets

(56) References Cited

U.S. PATENT DOCUMENTS

| | | | | |
|---|---|---|---|---|
| 2,918,300 A | * | 12/1959 | Hendrickson | A01B 3/46 16/18 A |
| 3,124,922 A | * | 3/1964 | Glass | A01D 80/00 16/18 R |
| 3,279,160 A | | 10/1966 | Worrel | |
| 3,306,369 A | | 2/1967 | Brewer | |
| 3,633,679 A | * | 1/1972 | Dahlberg et al. | A01B 33/021 172/123 |
| 4,119,156 A | * | 10/1978 | Wheeler et al. | A01B 3/46 172/386 |
| 4,236,587 A | * | 12/1980 | Shader et al. | E02F 3/7663 172/451 |
| 4,355,688 A | | 10/1982 | Hamm et al. | |
| 5,129,463 A | | 7/1992 | Handy | |
| 5,988,293 A | * | 11/1999 | Brueggen et al. | A01B 63/22 172/413 |
| 6,068,062 A | * | 5/2000 | Brueggen et al. | A01B 49/027 172/311 |
| 6,216,616 B1 | | 4/2001 | Bourgault | |
| 6,401,832 B1 | | 6/2002 | Payne et al. | |
| 7,350,347 B2 | | 4/2008 | Staheli | |
| 8,235,133 B2 | | 8/2012 | Friggstad | |
| 8,657,025 B2 | | 2/2014 | Thompson et al. | |
| 2008/0110649 A1 | | 5/2008 | Connell et al. | |
| 2014/0262370 A1 | | 9/2014 | Kohn et al. | |
| 2015/0053439 A1 | | 2/2015 | Ohnsat | |
| 2015/0129259 A1 | * | 5/2015 | Sudbrink et al. | A01B 63/22 172/407 |
| 2016/0037710 A1 | | 2/2016 | Anderson et al. | |

\* cited by examiner

ANTI WOBBLING CASTOR WHEEL CONFIGURATION

BACKGROUND OF THE INVENTION

1. Field of the Invention

The present invention relates to agricultural implements, and, more specifically, to castor wheel assemblies used in such implements.

2. Description of the Related Art

One of the widely used support systems for allowing ground movement at a precise elevation above the soil utilizes trailing wheels and front castor wheels. Towed tillage implements advantageously use this type of support system to more closely follow the soil contours. The trailing wheels (and the front castor wheels) are usually movable up and down so that the height of the implement frame above the soil may be controlled. Along with the trailing wheels, which have a fixed axis of rotation, there are usually a pair of forward castor wheels, widely used, so that the towed direction of the implement is followed by pivoting of the castor wheels. In addition to the field position, the rear wheels and the front castor wheels may be placed in a transport position in which the soil engaging elements of the tillage implement are elevated above the surface level of the soil.

While the castor wheels allow a simplified way of following the direction of movement set by a tractor pulling the implement, they do experience, under operating conditions, an oscillation that is considered to be wobbling. A number of factors can contribute to the wobble and they include weight balance, internal friction, towing speed and trailing arm geometry.

Because many of these factors are dynamic and not controlled necessarily by the machine operator, it has been proposed to include friction elements in the pivoting support for the castor wheel so as to inhibit wobbling. The friction elements, at first glance, offer a direct solution to the problem. However, the wear incurred by friction elements over time, decreases the inhibiting force and results in less effective damping of the wobble. It has been proposed to use spring loaded brake elements to offer a consistent friction force to inhibit the wobbling over an extended period of time. However, this approach introduces additional cost and complexity. Furthermore, the friction mechanisms maybe prone to accumulation of soil and other debris to diminish their effectiveness.

Accordingly, what is needed in the art is a simplified way to inhibit wobbling in a castor wheel assembly.

SUMMARY OF THE INVENTION

The present invention seeks to provide a simplified way of configuring a castor wheel assembly to reduce wobble.

In one aspect of the present invention, an agricultural implement is provided having a frame for towed movement along the soil extending laterally relative to the direction of movement and in a plane parallel to the plane of the soil over which it moves and a base connected to the frame by an articulated parallel link structural interconnection between said base and said frame for maintaining a constant orientation between the base and said frame. A spindle extends downward from the base and has a longitudinal axis A. A castor mounting structure having a bore is received over the spindle to permit pivoting movement about the spindle. An axle hub assembly supporting a wheel extends from the castor mounting structure. A wheel is mounted for rotation on the axle hub assembly. The axis A of said spindle is angled from a right angle orientation relative to the plane of said frame to inhibit oscillation of the castor support assembly.

An advantage of the present invention is a simplified and effective reduction in wobbling of the castor wheel assembly.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
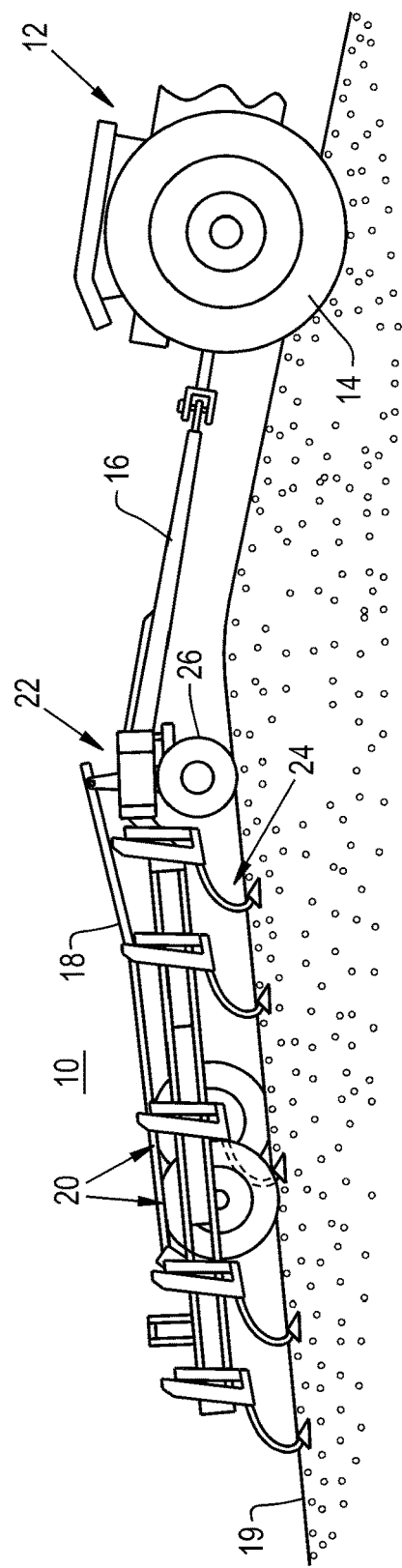
FIG. 1 is a side view of a towed agricultural implement which may incorporate the present invention.

Referring now to the drawings, and more particularly to FIG. 1, there is shown a tillage implement 10 which is towed by a tractor 12 having tractor drive wheels 14 over the soil 19. The tillage implement 10 is connected to the tractor 12 by a tow bar 16 and has a frame 18 supported above the soil 19 by a pair of trailing wheel assemblies 20 and forward castor wheel assemblies 22. The trailing wheel assemblies 20 and forward castor wheel assemblies 22 are configured to support the frame 18 at variable selected heights above the soil 19 according to the operational conditions and transport conditions of the tillage implement 10. Tillage implement 10, as illustrated, supports a plurality of cultivators 24. However, it should be understood by those skilled in the art that a wide variety of tools may be supported for broadly tilling the soil 19. During field operations, the trailing wheel assemblies 20 and the forward castor wheel assembly 22 support the frame so that the cultivators 24 are at a predetermined depth according to the particular requirements. During transport to the field, the trailing wheel assembly 20 and the forward caster wheel assemblies 22 elevate the frame 18 so that the cultivators 24 are clear of the soil 19. The mechanism for articulating the trailing wheel assemblies 20 and the forward castor wheel assemblies 22 is well known and is not described to enable a clearer focus on the invention.

During field operation and transport between fields, the trailing wheel assemblies 20 track the tow bar 16 and the castor wheel assemblies 22 pivot so that their wheels 26 track and follow the path established by the tractor 12 and the trailing wheel assemblies 20.

Figure 2:
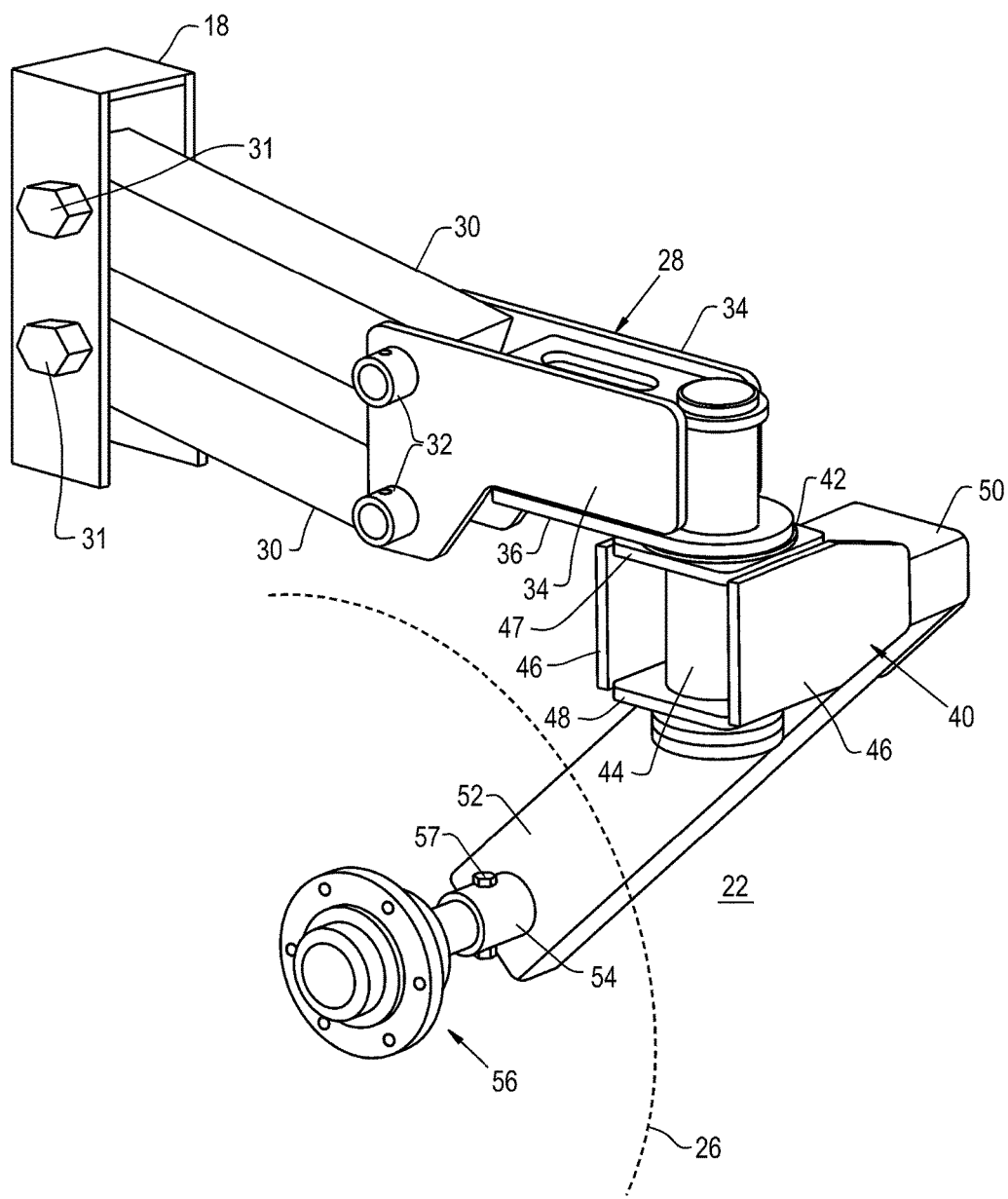
FIG. 2 is a perspective view of a castor support assembly for a wheel embodying the present invention.

While prior art castor wheel assemblies 22 adequately follow the movement, the fact that the castor wheel assemblies 22 pivot about a vertical axis can cause oscillation or wobbling, both in the field operation condition and in the transport condition. In accordance with the present invention, the castor support assembly illustrated in FIGS. 2-4 minimizes, if not eliminates, such wobbling. Referring first to FIG. 2, the castor support assembly 22 includes a base 28 supported by parallel links 30 having one end appropriately connected and articulated to frame 18 at 31. Parallel links 30 connect to base 28 at pivotal connections 32. The effect of the parallel link connection maintains the base 28 at a constant orientation relative to frame 18 and thus the soil 19.

The base 28 has a pair of side plates 34 extending from the pivotal connection 32 and reinforced with a web 36. A downwardly extending spindle 38 having a longitudinal axis A is connected to and supported by side plates 34 and web 36. The spindle 38 may be secured to the structures in many different ways, including welding. A castor mounting structure 40 includes a thrust washer 42 positioned over spindle 38 and a sleeve 44 forming a central through bore that is received over spindle 38. Thrust washer 42 may be formed from nylon or any other appropriate anti-friction material. Sleeve 44 is positioned between side plates 46 and interconnecting top and bottom webs 47 and 48 forming a structural unit. A box-like extension 50 extends laterally to an arm 52 which extends downwardly at an angle where a sleeve 54 extends at a right angle for supporting a removable axle hub assembly 56. A spindle 57, extendable through the sleeve 54 and axle hub assembly 56, permits removable mounting thereof. The wheel 26, shown by dashed lines in FIG. 2, is appropriately mounted on the axle hub assembly 56.

Figure 3:
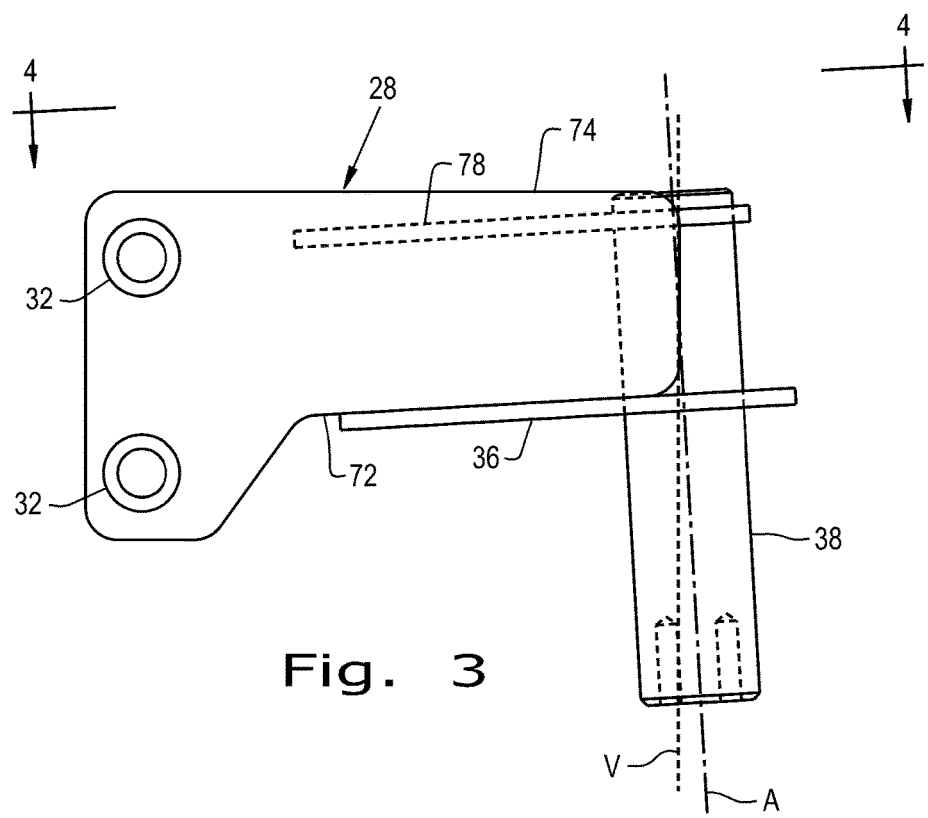
FIG. 3 is an enlarged fragmentary side view of the castor support assembly of FIG. 2; and, FIG. 4 is a view of the castor support assembly of FIGS. 2 and 3 taken on plane 4-4 of FIG. 3.
Figure 4:
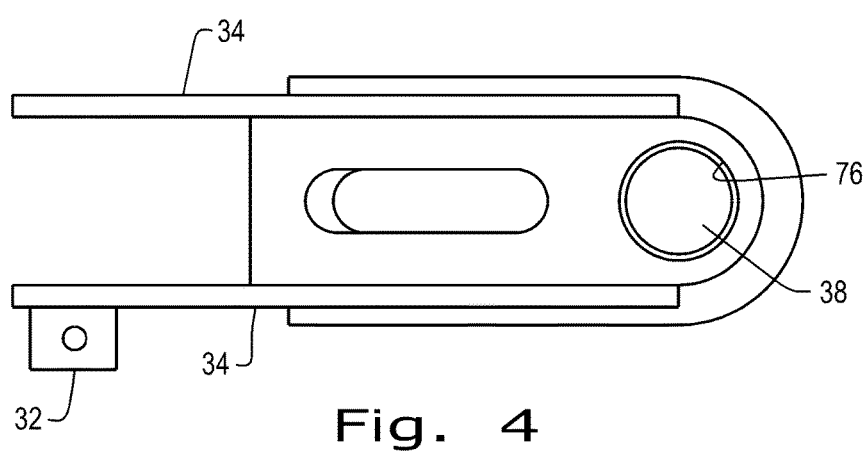

In prior art castor wheel assemblies, the longitudinal axis of spindle 38 is normally parallel to the plane of the frame 18. As stated above, this can produce unwanted oscillation or wobbling of the castor wheel. In accordance with the present invention, the spindle 38 has mounting structure as set forth in FIGS. 3 and 4. Referring now to FIG. 3, the base 28 has side plates 34 and are connected by web 36. As noted in FIG. 3, the bottom edge 72 is not parallel to the top edge 74 of side plates 34. The web 36 is secured to the bottom edge and forms an angle other than right angle with the top edge 74. The web 36 has a circular opening 76 through which the spindle 38 extends and is at a right angle to the longitudinal axis A of spindle 38. An upper web 78 extends between the side plates 34 and is also formed at a right angle to the axis A of spindle 38. The axis A forms an angle with respect to reference axis V which is established to be at a right angle to the top edge 74 of side plates 34 and through the parallel link interconnection at a right angle to the plane of frame 18. The direction of movement of the castor mounting structure is from left to right as shown in FIG. 3 so that the spindle 38 is angled in a forward direction. While the spindle 38 may be angled other than the forward direction, it has been found to be most effective when angled as illustrated and preferably at a three degree angle with respect to axis V.

In operation, the castor mounting structure 40 pivots about spindle 38 so that the castor wheel assemblies 22 track and follow the movement set by the tractor 12 and the trailing wheel assemblies 20. Because the axis A of spindle 38 is angled towards a forward direction and the wheel 26 trails, it will lower relative to frame 18 and increase the force exerted on wheel 26 by the weight of frame 18. This force urges castor wheel assembly 22 towards a straight ahead direction and minimizes, if not eliminates the oscillation that is otherwise experienced with a spindle oriented at a right angle. This is done without the need to provide complicated damping structure and is not affected by wear or use of the agricultural equipment.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A castor wheel assembly for a towed agricultural implement having a hitch, a frame, trailing wheels, and at least one tillage tool for tilling soil, the castor wheel assembly comprising:
   a base including a pair of spaced-apart side plates and spaced-apart upper and lower webs positioned between the side plates, the upper and lower webs including aligned openings therethrough, the base connected to the frame via a pair of pivotable parallel links which pivot on the base and the frame;
   a spindle including an upper end positioned through the aligned openings of the upper and lower webs of the base;
   a mounting structure including a sleeve surrounding and supporting a lower end of the spindle which extends through the sleeve; and
   an arm coupled at one end thereof to a portion of the mounting structure, the arm including an opposite end which carries a removable axle hub assembly for holding a wheel,
   wherein the spindle is positioned in an upright orientation and has a longitudinal axis positioned though the spindle, the longitudinal axis which is near a vertical axis,
   wherein the arm is spaced-away from the spindle and carried at an angle relative to the spindle such that at least a portion of the arm is positioned below and to a side of the base, the arm extending downward below and to a side of at least a portion of the pair of parallel links,
   wherein the mounting structure includes an upper web and a lower web, the upper web of the mounting structure positioned below the lower web of the base, the mounting structure including spaced-apart side plates positioned between the upper web and the lower web such that the sleeve is positioned between the side plates and the upper web and the lower web and supported therein, and
   wherein the base, the spindle, the mounting structure, the arm, and the removable axle hub assembly cooperate to inhibit oscillation.

2. The castor wheel assembly as claimed in claim 1, wherein a portion of the removable axle hub assembly is positioned below at least the portion of the pair of parallel links.

3. The castor wheel assembly as claimed in claim 1, wherein the longitudinal axis is positioned within three degrees of the vertical axis.

4. The castor wheel assembly as claimed in claim 1, wherein the spaced-apart upper and lower webs of the base are parallel relative to each other and each of the upper and lower webs are positioned perpendicular relative to the longitudinal axis.

5. The castor wheel assembly as claimed in claim 4, wherein top edges of the side plates of the base are not aligned with the upper web of the base, and the upper web of the base is positioned at an angle relative to the top edges of the side plates.

6. The castor wheel assembly as claimed in claim 1, wherein a washer is positioned between the lower web of the base and the upper web of the mounting structure.

7. The castor wheel assembly as claimed in claim 1, wherein the mounting structure further includes a box extension, and the arm extends from the box extension of the mounting structure.

8. The castor wheel assembly as claimed in claim 1, wherein the at least a portion of the arm which extends below and to a side of the at least portion of the pair of parallel links includes the removably axle hub assembly.

* * * * *